US010754780B2

(12) United States Patent
Anderson et al.

(10) Patent No.: US 10,754,780 B2
(45) Date of Patent: *Aug. 25, 2020

(54) MAINTAINING TRACK FORMAT METADATA FOR TARGET TRACKS IN A TARGET STORAGE IN A COPY RELATIONSHIP WITH SOURCE TRACKS IN A SOURCE STORAGE

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,003

(22) Filed: Nov. 30, 2018

(65) Prior Publication Data

US 2019/0102306 A1    Apr. 4, 2019

Related U.S. Application Data

(63) Continuation of application No. 15/688,763, filed on Aug. 28, 2017, now Pat. No. 10,223,274.

(51) Int. Cl.
*G06F 12/08* (2016.01)
*G06F 12/0868* (2016.01)
*G06F 3/06* (2006.01)

(52) U.S. Cl.
CPC .......... *G06F 12/0868* (2013.01); *G06F 3/065* (2013.01); *G06F 3/0611* (2013.01); *G06F 3/0614* (2013.01); *G06F 3/0683* (2013.01)

(58) Field of Classification Search
None
See application file for complete search history.

(56) References Cited

U.S. PATENT DOCUMENTS 6,832,290 B2    12/2004    Todd
7,139,933 B2    11/2006    Hsu et al.
(Continued)

OTHER PUBLICATIONS

IBM; "System, Method and Service for Automated Capacity Expansion of a Data Deduplication Repository"; http://ip.com/IPCOM/000184411D; Jun. 23, 2009.

(Continued)

*Primary Examiner* — Kevin Verbrugge
(74) *Attorney, Agent, or Firm* — Konrad Raynes Davda & Victor LLP; David W. Victor

(57) ABSTRACT

Provided area computer program product, system, and method for maintaining track format metadata for target tracks in a target storage in a copy relationship with source tracks in a source storage. Upon receiving a request to a requested target track in the target storage, the source track for the requested target track is staged from the source storage to a cache to be used as the requested target track in response to determining that the copy relationship information indicates that a source track needs to be copied to the requested target track. A determination is made of track format metadata for the requested target track, comprising the staged source track, indicating a format and layout of data in the requested target track and a track format code identifying the track format metadata. The track format code is included in a cache control block for the requested target track.

21 Claims, 9 Drawing Sheets

(56) References Cited

U.S. PATENT DOCUMENTS

| | | |
|---|---|---|
| 8,027,952 B2 | 9/2011 | Kern et al. |
| 8,332,581 B2 | 12/2012 | Candelaria et al. |
| 8,606,767 B2 | 12/2013 | Brown et al. |
| 8,825,973 B2 | 9/2014 | Ash et al. |
| 8,825,975 B2 | 9/2014 | Ash et al. |
| 9,104,552 B1 | 8/2015 | Bolt |
| 9,298,567 B2 | 3/2016 | Blea et al. |
| 9,317,207 B2 | 4/2016 | Hu et al. |
| 9,489,389 B2 | 11/2016 | Patil et al. |
| 2008/0126913 A1 | 5/2008 | Benhanokh et al. |
| 2011/0191522 A1 | 8/2011 | Condict et al. |
| 2012/0102078 A1 | 4/2012 | Flick et al. |
| 2014/0115261 A1 | 4/2014 | Maybee et al. |
| 2014/0325145 A1 | 10/2014 | Sampathkumar |
| 2015/0286432 A1 | 10/2015 | Dain et al. |
| 2016/0085460 A1 | 3/2016 | Chandrashekar |
| 2017/0052822 A1 | 2/2017 | Ash et al. |
| 2017/0111468 A1 | 4/2017 | Ash et al. |
| 2017/0124001 A1 | 5/2017 | Ash et al. |

OTHER PUBLICATIONS

Anonymously; "A Systematic Framework for Managing Data Rules at Scale: For Big Data, The Cloud, and Beyond"; http://ip.com/IPCOM/000242035D; Jun. 15, 2015.

Anonymously; "Record Level Change Tracking Included within a Data Set"; http://ip.com/IPCOM/000239805D; Dec. 2, 2014.

Anonymously; "Optimized Deduplication Metadata Online Redistribution"; http://ip.com/IPCOM/000228925D; Jul. 15, 2013.

U.S. Appl. No. 15/662,186, filed Jul. 27, 2017, (18.729).

U.S. Appl. No. 15/662,194 filed Jul. 27, 2017, (18.733).

U.S. Appl. No. 15/662,200, filed Jul. 27, 2017, (18.734).

U.S. Appl. No. 15/672,460, filed Aug. 9, 2017, (18.735).

U.S. Appl. No. 15/666,525, filed Aug. 1, 2017, (18.738).

U.S. Appl. No. 15/694,704, filed Sep. 1, 2017, (18.756).

U.S. Appl. No. 15/662,205, filed Jul. 27, 2017, (18.752).

U.S. Appl. No. 15/672,470, filed Aug. 9, 2017, (18.754).

U.S. Appl. No. 15/688,763, filed Aug. 28, 2017, (18.742).

List of IBM Patents or Patent Applications Treated as Related, Nov. 30, 2018, Total 2 pp.

Notice of Allowance for U.S. Appl. No. 15/688,763, pp. 14, dated Oct. 10, 2018, (18.742).

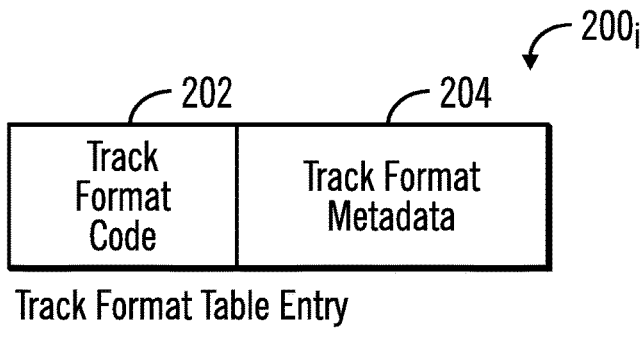
FIG. 2 Track Format Table Entry
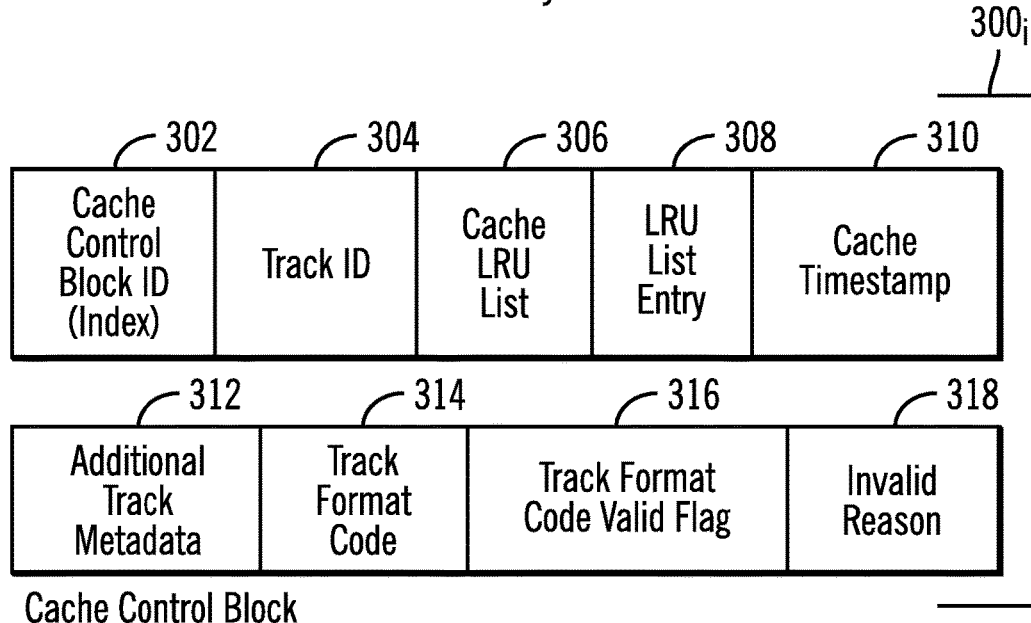
FIG. 3 Cache Control Block
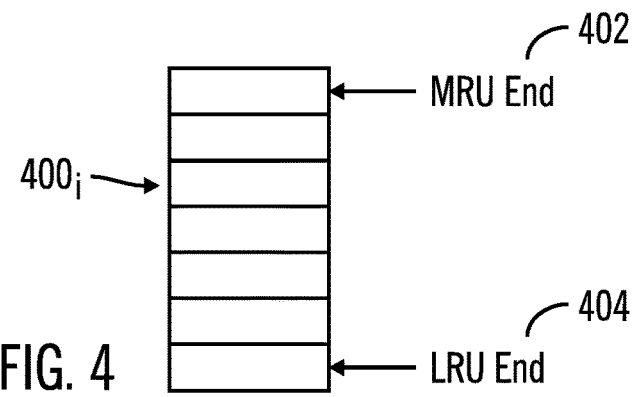
FIG. 4
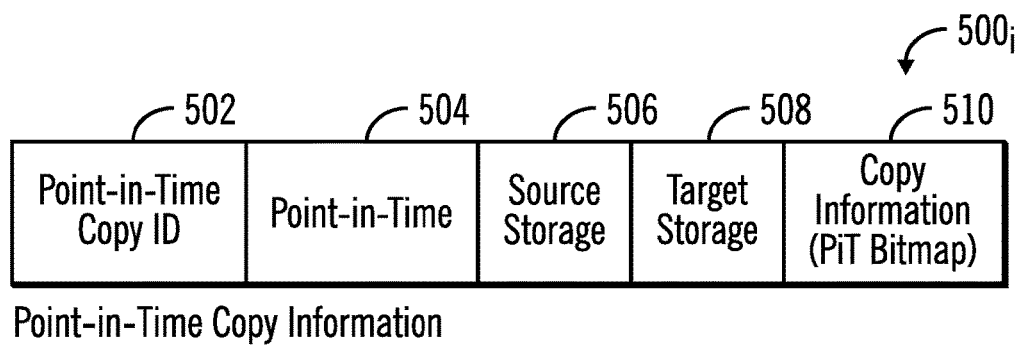
FIG. 5 Point-in-Time Copy Information

MAINTAINING TRACK FORMAT METADATA FOR TARGET TRACKS IN A TARGET STORAGE IN A COPY RELATIONSHIP WITH SOURCE TRACKS IN A SOURCE STORAGE

BACKGROUND OF THE INVENTION

1. Field of the Invention

The present invention relates to a computer program product, system, and method for maintaining track format metadata for target tracks in a target storage in a copy relationship with source tracks in a source storage.

2. Description of the Related Art

In a storage environment, a host system may communicate a read/write request to a connected storage system over a network channel through a network adaptor. If the data is in a cache of the storage system, i.e., a read hit, then the data may be returned quickly to the host system. This reduces the delay in returning requested data to a host I/O request. However, if the requested data is not in the cache of the storage system, then there may be significant latency realized while the storage system needs to retrieve the requested data from storage to return. Further, the thread or task executing the host read request may have to be context switched and deactivated in order to allow the host system to process further I/O requests. When the data is returned to the read request, then the task must be reactivated and data for the task must be returned to registers and processor cache to allow processing of the returned data for the read request.

In storage environments having copy relationships between a source storage and a target storage, updated source tracks in a copy relationship are copied over to corresponding target tracks in the target storage to maintain data consistent between the source and target storages as of a point-in-time. The point-in-time source track may be copied when an update to the source track is to be destaged to the source storage as part of a copy-on-destage operation. In this way, the point-in-time version of the source track in the source storage is copied before being updated by the destaged source track.

In the prior art, if a request is directed to a target track in a point-in-time copy relationship, then a determination is made if the requested track is in the cache. The presence of the requested target track in the cache results from either the target track in cache having been staged from the source storage or staged from the target storage. In either case, the track format metadata needs to be rebuilt from the data for the requested target track in the cache because the target track metadata from the target storage may not be for the data in the track in the cache if the target track in the cache comprises a source track staged from the source storage.

There is a need in the art for improved techniques for processing host read/write requests to a target track in the target storage that is in a point-in-time copy relationship with a source storage.

SUMMARY

Provided are a computer program product, system, and method for maintaining track format metadata for target tracks in a target storage in a copy relationship with source tracks in a source storage. Upon receiving a request to a requested target track in the target storage, a determination is made as to whether copy relationship information for the point-in-time copy relationship indicates that a source track needs to be copied to the requested target track in the target storage. The source track for the requested target track is staged from the source storage to a cache to be used as the requested target track in response to determining that the copy relationship information indicates that a source track needs to be copied to the requested target track. A determination is made as to whether track format metadata for the requested target track, comprising the staged source track, indicates a format and layout of data in the requested target track. A determination is made of a track format code identifying the track format metadata. The track format code is included in a cache control block for the requested target track. The track format code in the cache control block is used to determine the track format metadata to process subsequent requests to the requested target track in the cache.

BRIEF DESCRIPTION OF THE DRAWINGS

FIG. 2 illustrates an embodiment of a track format table entry.

FIG. 3 illustrates an embodiment of a cache control block.

FIG. 4 illustrates an embodiment of a Least Recently Used (LRU) list of tracks in the cache.

FIG. 5 illustrates an embodiment of a point-in-time copy relationship.

DETAILED DESCRIPTION

Figure 1:
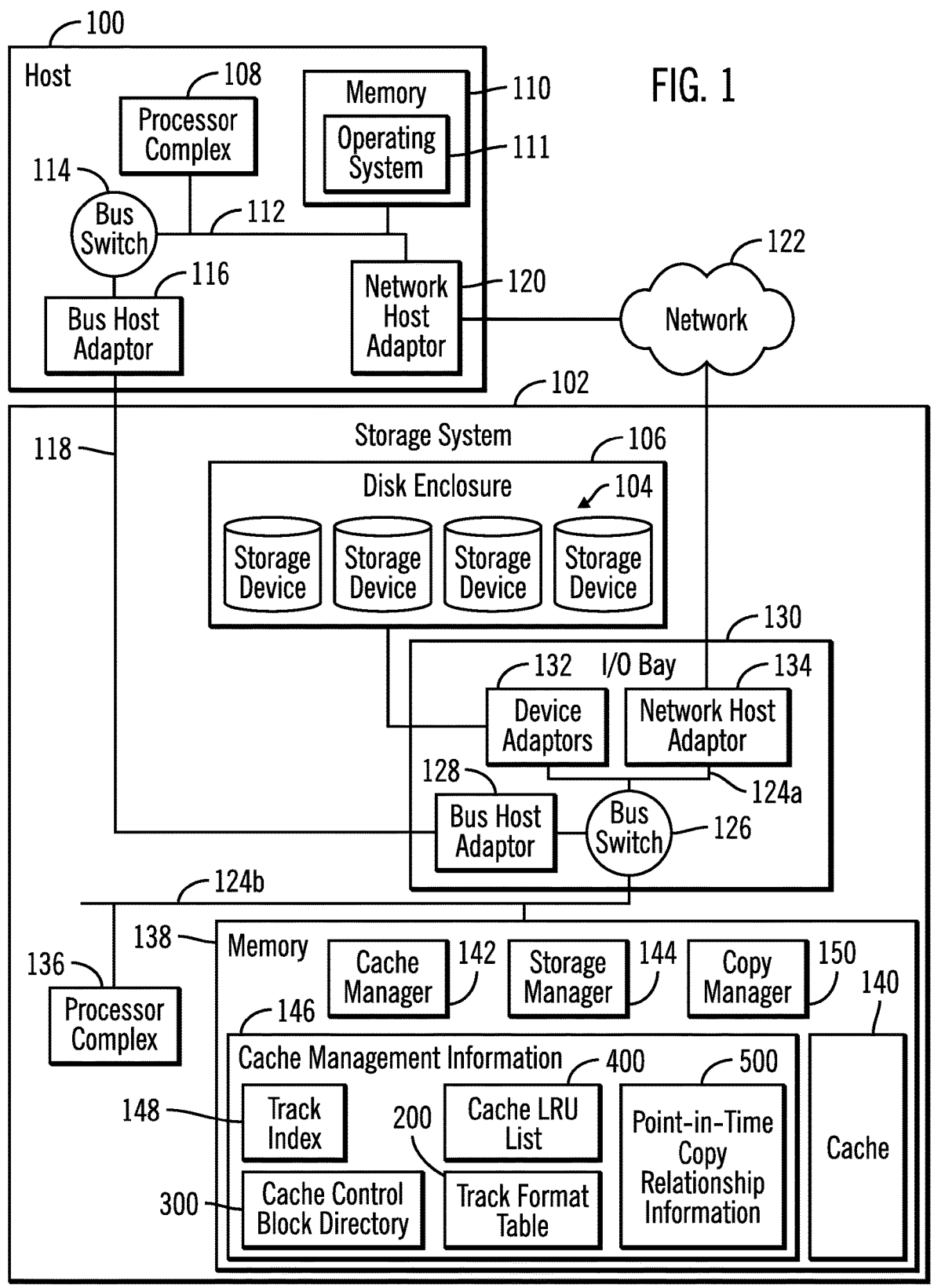
FIG. 1 illustrates an embodiment of a storage environment.

In a storage environment, a host system may first communicate a read/write request to a connected storage system over a fast channel, such as a bus interface, such as the Peripheral Component Interconnect Express (PCIe) interface. For a read/write request over the fast channel which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. The storage system will have to access track metadata to process a request to a track. The track metadata provides information on the format of data and layout of records in the track that are needed in order to perform reads and writes to the track. However, the reading of the track metadata from the storage comprises a substantial portion of the latency in processing read/write request. Described embodiments provide improvements to cache technology that reduce cache operation latency by including a track format code in the cache control block for a track in the cache. This track format code may be used for fast access to the track format from a track format table without having to read the track metadata from storage. By eliminating the need to read the track metadata from a metadata track in storage to determine the track layout, described embodiments increase the likelihood that read/write requests on the first channel that need to be completed within a threshold time are completed by accessing the track layout information for a track from the track format table, associating track format codes with track format information for common track formats.

With described embodiments, a read/write request to a target track on a channel requiring that the request be completed within a threshold time is processed if the track format code for the target track is within the cache control block for the target track. Using the track format code to access the track format metadata from the track format table reduces the latency of access to the track format metadata to allow the read/write request to complete within the time threshold. This keeps the time the host thread is spinning on the read/write request task for the read/write request sent on the bus interface within an acceptable time threshold. However, if the cache control block for the target track does not have a valid track format code, then the read/write request on the first channel is failed because it is unlikely the read/write request can complete within the threshold time given that the track format metadata will have to be retrieved from the storage. Failing the read/write request on the first channel, causes the host to redrive the read/write request on the second channel. The processing of the read/write request on the second channel reads in the track metadata from the storage to allow for processing the read/write request and adding the track format code to the cache control block for the target track.

In further embodiments, a source storage system may copy source tracks from a source storage to target tracks in a target storage in a target storage system as part of a copy relationship. If there is a read or write request to a target track in the target storage system, then a determination may be made as to whether a source track corresponding to the target track in the copy relationship has been copied to the target storage. If the point-in-time source track for the requested target track has not yet been copied to the target storage, then the target storage system may stage the source track into the target cache to use for the requested target track. Further, when the source track is staged into the target track, track metadata may be built for the source track being used for the target track. If track format metadata in the built track metadata matches track format metadata in the track format table, then the track format code for the matching track format metadata may be included in the cache control block for the source track staged into cache for the requested target track to use for subsequent requests to the requested target track. This improves performance for requests to target tracks in the cache that are in a copy relationship, because the track format metadata for such a cached target track may be readily determined from the track format code without having to rebuild the track metadata from the target track in the cache, which may comprise the point-in-time source track staged from the source storage.

Further, if a request for a target track is received on a channel requiring that the request be completed within a threshold time, then a determination may be made as to whether a copy relationship indicates that the point-in-time source track corresponding to the requested target track needs to be copied to the target storage. In such case, the request on the fast channel requiring processing within a time constraint is failed because too much latency would be introduced by having to stage the source track to the cache to use for the requested target track. However, once the track format code for the track format metadata of the staged point-in-time source track is in the cache control block, than the track format code may be used to determine the track format metadata to use to complete future requests to the target track on the channel requiring fast response.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel is a bus interface, such as a Peripheral Component Interconnect Express (PCIe), including a bus 112, a bus switch 114 to connect one or more devices on the bus 112, including the processor complex 108, a memory 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124*a*, 124*b*, a bus switch 126 to connect to endpoint devices on the bus 124*a*, 124*b*, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142, a storage manager 144, and a copy manager 150. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), etc., which is part of a larger grouping of tracks, such as a volume, logical device, etc.

The cache manager 142 maintains cache management information 146 in the memory 138 to manage read (unmodified) and write (modified) tracks in the cache 140. The cache management information 146 may include a track format table 200 having track format codes for common track format descriptors providing details of a layout and format of data in a track; track index 148 providing an index of tracks in the cache 140 to cache control blocks in a control block directory 300; and a Least Recently Used (LRU) list 400 for tracks in the cache 140. The control block directory 300 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 400 is full or has reached a threshold level, tracks are demoted from the LRU list 400 to make room for more tracks to stage into the cache 140 from the storage 104.

The copy manager 150 manages point-in-time copy relationships in point-in-time copy relationship information 500 to copy data as of a point-in-time from a source storage to a target storage. The copy manager 150 would copy over point-in-time source tracks to the target storage tracks before the source tracks are updated so that the target storage maintains the source tracks as of the point-in-time, and before they are updated after the point-in-time of the copy relationship.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

FIG. 2 illustrates an embodiment of a track format table entry $200_i$ in the track format table 200, which includes a track format code 202 and the track format metadata 204. In certain embodiments Count Key Data (CKD) track embodiments, the track format metadata 204 may comprise a track format descriptor (TFD) indicating a number of records in the track, a block size, a number of blocks in the track, a data length of each of the records, and a control interval size indicating an amount of data that is read or written atomically as a unit, number of blocks in a control interval, and whether a control interval spans two tracks, and other information. The track format code 202 may comprise an index value of the index entry $200_i$ in the track format table 200. For instance, if there are 32 track format table entries $200_i$, then the track format code 202 may comprise 5 bits to reference the different possible number of 32 entries $200_i$.

FIG. 3 illustrates an embodiment of a cache control block $300_i$ for one of the tracks in the cache 140, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 140 and indicated on the LRU list 306; additional track metadata 312 typically maintained for tracks stored in the cache 140, such as a dirty flag indicting whether the track was modified; a track format code 314 comprising one of the track format codes 202 of the track format metadata 204 describing the layout of data in the track 304 represented by the cache control block $300_i$; a track format code valid flag 316 indicating whether the track format code 314 is valid or invalid; and an invalid reason 318 indicating a reason for the track format code valid flag 316 code being invalid, as indicated in the track format code valid flag 316.

FIG. 4 illustrates an embodiment of an LRU list $400_i$, such as having a most recently used (MRU) end 402 identifying a track most recently added to the cache 140 or most recently accessed in the cache 140 and a least recently used (LRU) end 404 from which the track identified at the LRU end 404 is selected to demote from the cache 140. The MRU end 402 and LRU end 404 point to track identifiers, such as a track identifier address or a cache control block index for the track, of the tracks that have been most recently added and in the cache 140 the longest, respectively, for tracks indicated in that list 400.

FIG. 5 illustrates an instance of the point-in-time copy information $500_i$, which may include a point-in-time copy identifier 502 identifying the point-in-time copy created by the copy manager 150; a point-in-time 504 of the point-in-time copy 502, which may mean that data is consistent as of that point-in-time 504; a source storage 506 and target storage 508 of the point-in-time copy relationship; copy information 510 indicating which data or tracks in the source storage 506 have been copied to the target storage 508 for data as of the point-in-time 504. The copy information 510 may comprise a bitmap having a bit for each data unit (e.g., track) that is set to one of two values indicating the data or track represented by the bit has or has not been copied from the source storage to the target storage as part of the copy relationship.

In certain embodiments, the point-in-time copy relationship $500_i$ may comprise a FlashCopy® (FlashCopy is a registered trademark of IBM), snapshot, etc. A point-in-time copy replicates data in a manner that appears instantaneous and allows a host to continue accessing the source storage while actual data transfers to the copy volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until modified data for the source track is to be destaged to the source volume. Data transfers may also proceed as a background copy process with minimal impact on system performance. The copy information 510 indicates those source tracks in the source storage 506 that have been copied to the target storage for the point-in-time copy relationship $500_i$, such as being copied in response to an updated source track being destaged to the source storage, i.e., a copy-on-destage. In this way, the source track as of the point-in-time 504 in the source storage 506 are copied to the target storage 508 before being updated by a destage, or copy-on-destage operation. The copy information 510 is updated, such as the bit is set, when copying over the source track from the storage 506 to the target storage 508.

In one embodiment, the source storage 506 and target storage 508 may comprise source and target volumes configured in the storage 104, where source tracks and target tracks from the source and target storages are cached in the cache 140 managed by a single processor complex 136. In an alternative embodiment, the source storage 506 and target storage 508 may be implemented in separate storage systems that communicate over a network, where the source and target storage systems have separate caches to store tracks from the source and target storages. In a still further embodiment, the source and target storages may be in the same storage system but managed by different first and second processing nodes in the storage system. For instance, tracks in the source storage may be managed by a first processing node, having a first cache, in a dual processing node system, and the target tracks in the target storage may be managed by a second processing node, having a second cache, in the dual processing system. In such dual processing node systems, the source tracks and target tracks may be maintained in the separate caches in the first and second processing nodes.

Figure 6:
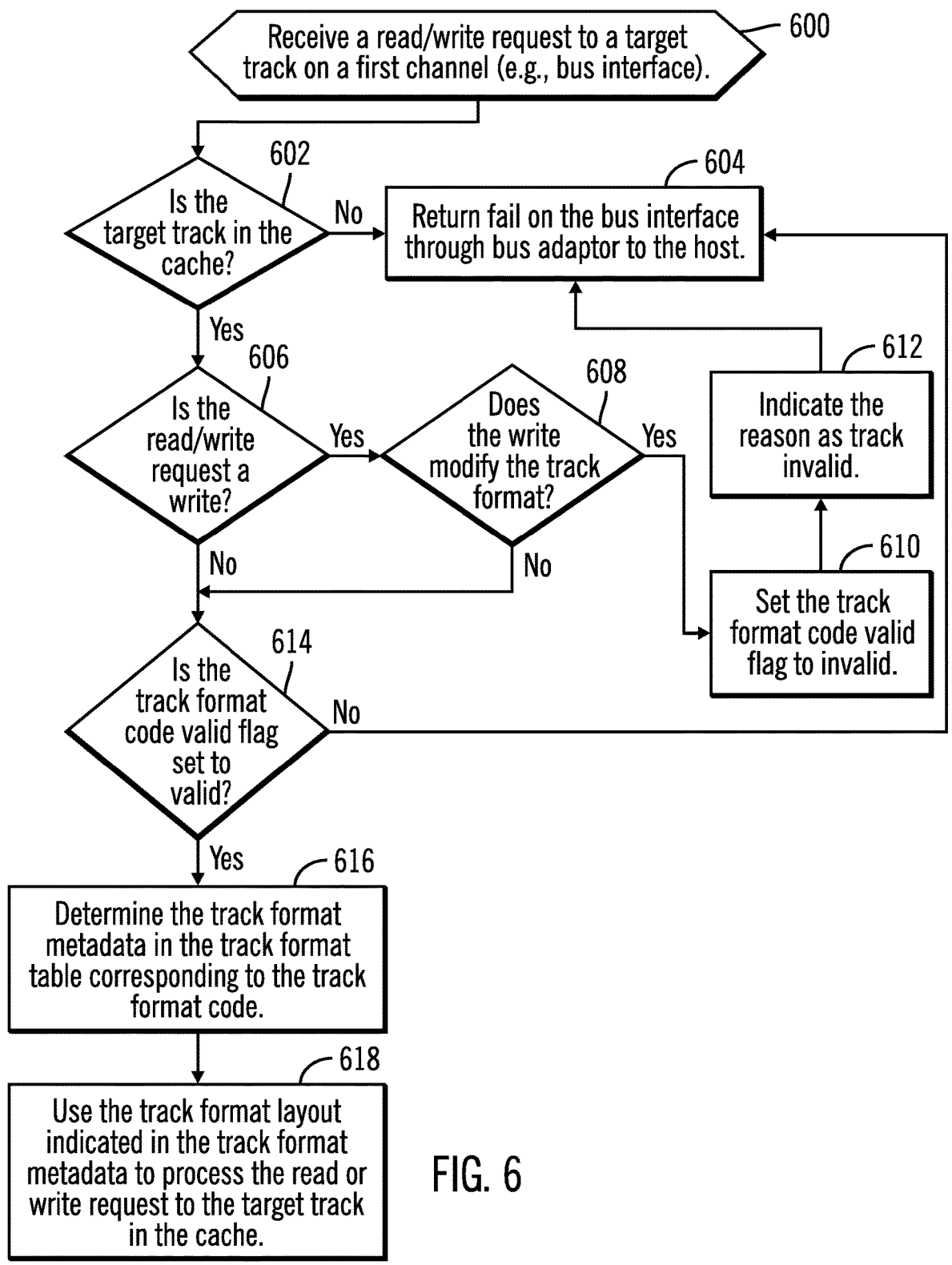
FIG. 6 illustrates an embodiment of operations to process a read/write request received on a first channel, such as a bus interface.

FIG. 6 illustrates an embodiment of operations performed by the cache manager 142 and storage manager 144 to process a read/write request to a target track received on a first fast channel, such as the PCIe bus interface via bus host adaptor 128. Upon receiving (at block 600) the read/write request at the bus host adaptor 128, if (at block 602) the target track is not in the cache 140, then the storage manager 144 returns (at block 604) fail to the read/write request on the first channel or bus host adaptor 128 to the host 100, which causes the host 100 to retry the read/write request on the second channel or network host adaptor 120, 134. Failure is returned because if the target track is not in the cache 140, then the target track and track metadata needs to be staged into cache 140, which would likely exceed the time threshold for read/writes on the first channel, where the host processor is spinning on the thread of the read/write request. If (at block 602) the target track is in the cache 140 is a write and if (at block 608) the write modifies the track format, then the cache manager 142 sets (at block 610) the track format code valid flag 316 to invalid and indicates (at block 512) the invalid reason 318 that the track in the cache 140 was invalidated as track format change. The storage manager 144 then returns (at block 604) fail to the host 100 because the track metadata needs to be read from the storage 104 to update with the modified track format.

If (at block 606) the read/write request is a read or if (at block 608) the request is a write that does not modify the track format, then the cache manager 142 determines (at block 614) if the track format code valid flag 316 is set to valid. If so, then the cache manager 142 determines (at block 616) the track format metadata 204 in the track format table 200 corresponding to the track format code 314 in the cache control block $300_i$. The cache manager 142 uses (at block 618) the track format layout indicated in the determined track format metadata 204 to process the read or write request to the target track in the cache 140. If the request is a write, a dirty flag 312 in the cache control block $300_i$ may be set to indicate the track is modified. If (at block 614) the track format code valid flag 316 is invalid, meaning there is no fast access to track format information available through the track format code 314, then the storage manager 144 returns (at block 604) fail on the bus interface to the bus host adaptor 128 because the track format table 200 cannot be used, and the track metadata needs to be read from the storage 104, which would introduce too much latency for the fast read/write on the first channel.

With the embodiment of operations of FIG. 6, during a fast write over the bus interface or first channel, if the track format metadata may be accessed without latency through the track format table 200, then the read/write request is allowed to proceed when the transaction can be processed very quickly because the track metadata can be obtained directly from the track format table 200 through the track format code 314, without having to read the track metadata from storage 104. However, if the cache control block $300_i$ does not have a valid track format code 314 to allow low latency access of track format metadata, then the read/write request is failed because the transaction will not likely complete within a fast time threshold. This determination is important to avoid host delays in processing other tasks while the host processor is spinning on the thread handling the read/write request while waiting for the read/write request to complete. If the track metadata can be accessed from the track format table 200 than there is a high likelihood the read/write can complete on the bus interface channel within the time required to avoid the host processor holding the thread for too long, which causes other I/O requests to be queued and delayed. If the track metadata cannot be accessed from the track format table 200 and needs to be read from the storage 104, then it is unlikely the read/write request will complete within the time threshold for the host processor to spin on the thread for the read/write request, and failure is returned. Returning failure when the track metadata cannot be obtained from the track format table 200 causes the host thread waiting on the read/write request task to be deactivated and the host processor may context switch to processing other tasks, and then the read/write request is retried on the second network channel during the context switch.

Figure 7:
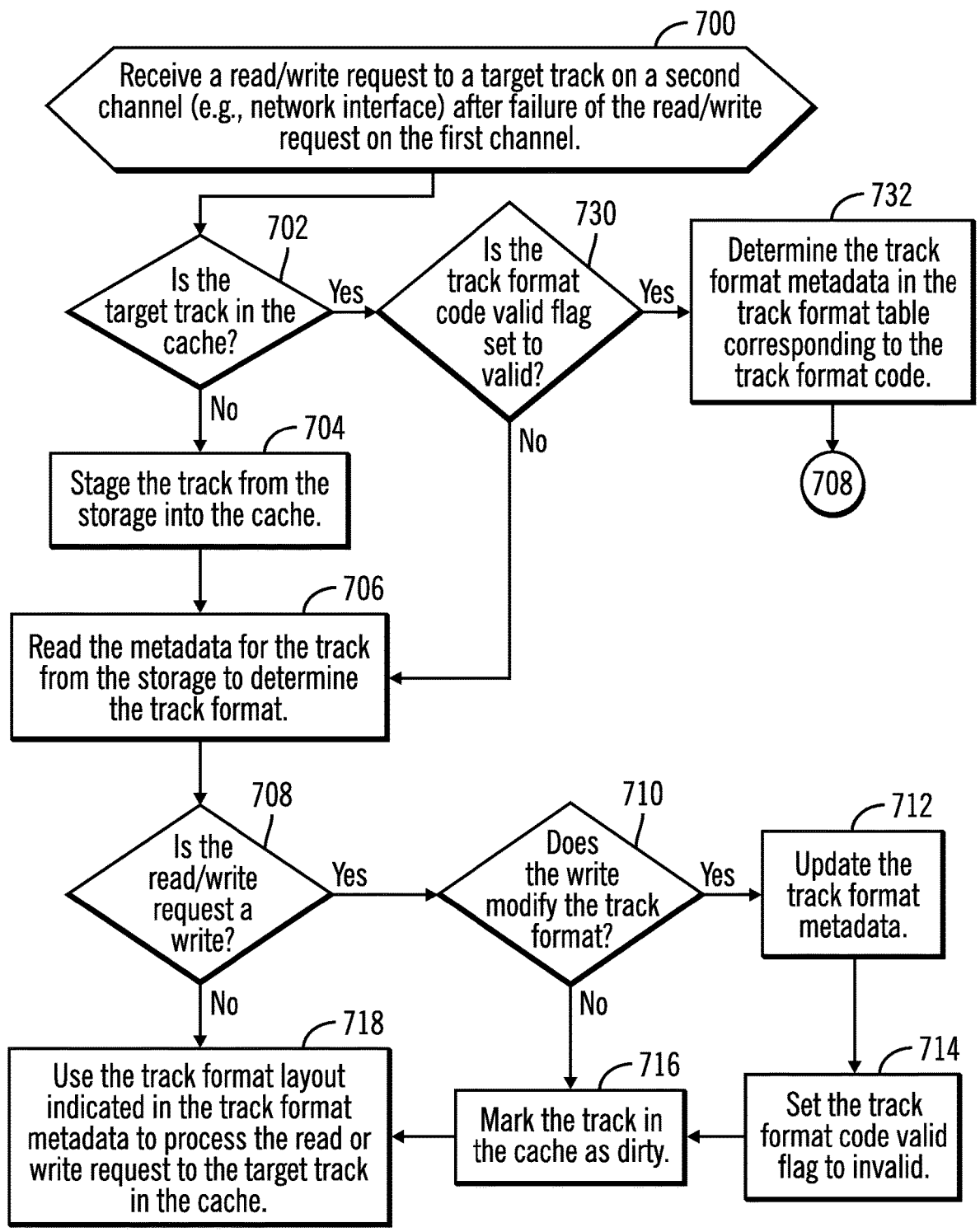
FIG. 7 illustrates an embodiment of operations to process a read/write request received on a second channel, such as a network.

FIG. 7 illustrates an embodiment of operations performed by the cache manager 142 and storage manager 144 to process a read/write request to a target track received on a second channel, such as the network 122 on network host adaptor 134. Upon receiving (at block 700) the read/write request, if (at block 702) the target track is not in the cache 140, then the cache manager 142 stages (at block 704) the track from the storage 104 to the cache 140 and reads (at block 706) the track metadata for the target track from the storage 104 to determine the track format, e.g., size of blocks, control interval, layout of records on the track, etc. If (at block 708) the read/write request is a write and if (at block 710) the write modifies the track format, then the cache manager 142 updates (at block 712) the track metadata to indicate the modified track format and sets (at block 714) the track format code valid flag 316 to invalid. The track metadata 312 is further updated (at block 716) to indicate the track is modified or dirty. If (at block 708) the request is a read or from block 716, the cache manager 142 uses (at block 718) the track format layout indicated in the track format metadata to process the read or write request to the target track in the cache 140.

If (at block 702) the target track is in the cache 140 and if (at block 730) the track format code valid flag 316 is set to valid, then the cache manager 142 determines (at block 732) the track format metadata 204 in the track format table 200 corresponding to the track format code 314 in the cache control block $300_i$ for the target track. From block 632, control proceeds to block 708 to process the read/write request. If (at block 730) the track format code valid flag 316 is set to invalid, then control proceeds to block 706 to read the metadata for the track form the storage 104 to determine the track format layout.

With the embodiment of FIG. 7, when the read/write request is received on the second slower channel, such as over the network 122, where the host operating system 111 would have performed a context switch for the thread handling the read/write request, the cache manager 142 may read the track metadata from the storage 104 to determine the track layout to process the request. During this time, the host processing of further host requests is not delayed because the host thread handling the read/write request is context switched and not active, until the read/write request returns complete.

Figure 8:
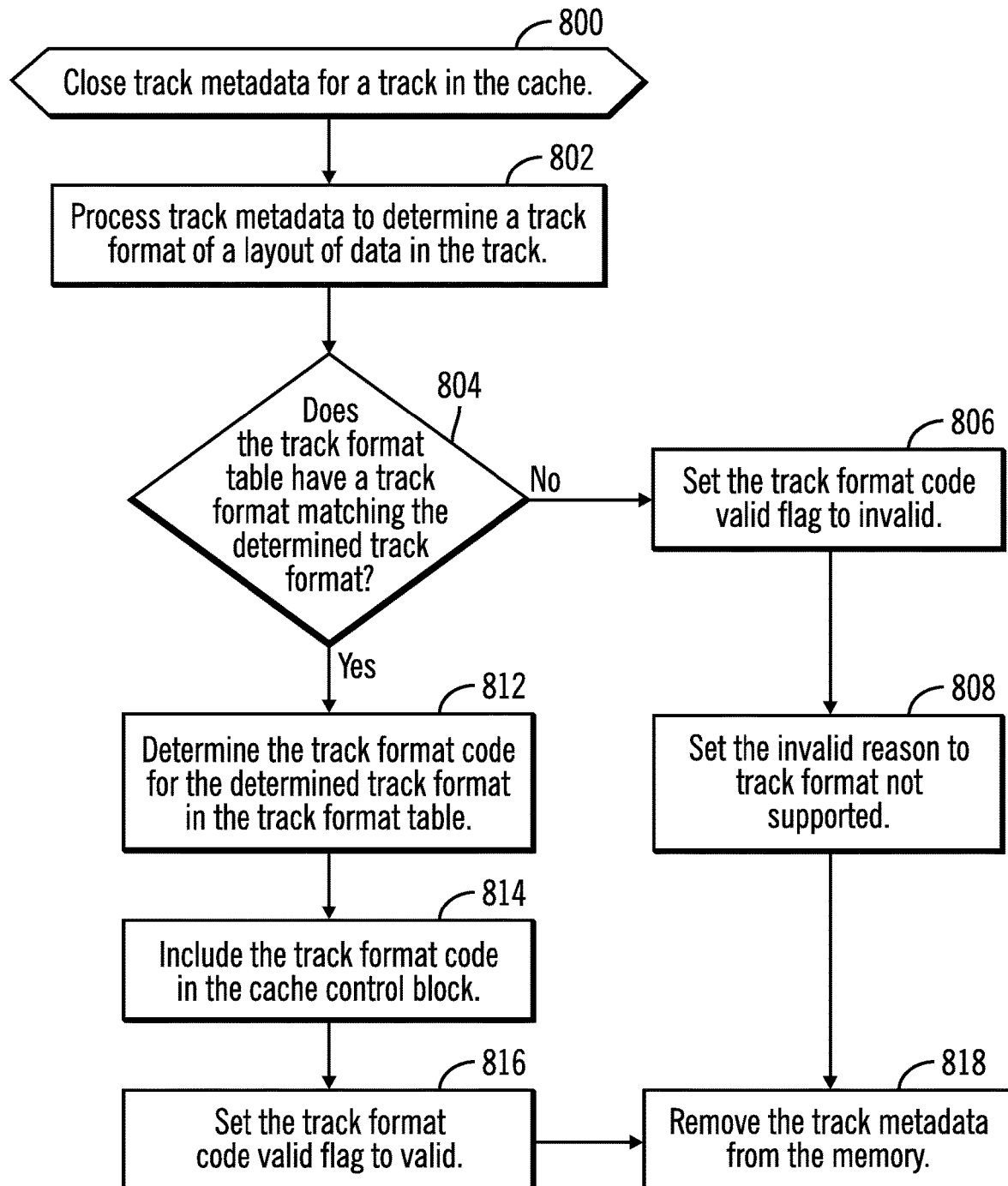
FIG. 8 illustrates an embodiment of operations to close track metadata and determine a track format code for the track in cache of the closed track metadata.

FIG. 8 illustrates an embodiment of operations performed by the cache manager 142 when closing the track metadata for a track in the cache 140, which involves destaging the track metadata to the storage 104 if changed. Upon closing (at block 800) the track metadata for a track in the cache 140, the cache manager 142 processes (at block 802) the track metadata to determine a track format or a layout of data in the track. If (at block 804) the track format table 200 does not have a track format metadata 204 matching the determined track format from the track metadata, which may happen if the determined track format is irregular, then the track format code valid flag 316 is set (at block 806) to invalid and the invalid reason 318 is set to indicate that the track format is not supported. In such situation, read/write requests to the track having an irregular format are only processed when received through the second channel via network host adaptor 134.

If (at block 804) the track format table has a track format metadata 204 matching the determined track format from the track metadata, then the cache manager 142 determines the track format code 202 for the determined track format metadata 204 in the track format table 200 and includes the track format code 202 in the field 314 in the cache control block $300_i$. The track format code valid flag 316 is set (at block 816) to valid. From block 808 or 816, control proceeds to block 818 to destage the track metadata from the memory 138 if modified or discard if not modified.

With the operations of FIG. 8, the track format information may be indicated in the cache control block $300_i$ with a track format code 202 having a limited number of bits to index track format metadata 204 describing track layout in a track format table 200, where the track metadata itself would not fit into the cache control block $300_i$. For future read/write accesses, if a valid track format code 314 is provided, then the cache manager 142 may use that track format code 314 to obtain with low latency the track format metadata 204 from the track format table 200 without having to read the track metadata from the storage 104 and process to determine the track format.

Embodiments Concerning a Copy Relationship Between a Source Storage and a Target Storage In a point-in-time copy relationship, source tracks in a source storage are copied to the target tracks in a target storage when an updated source track in the cache is going to be destaged to the source storage, as part of a copy-on-destage operation at the source storage. In this way, the point-in-time version of the source track in the source storage is copied before being updated by the destaged source track.

In the prior art, if a request is directed to a target track, then a determination is made if the requested track is in the cache. The presence of the requested target track in the cache results from either the target track in cache having been staged from the source storage or staged from the target storage. In either case, the track format metadata needs to be rebuilt from the data for the requested target track in the cache because the target track metadata from the target storage may not be for the data in the target track in the cache if the target track in the cache was staged from the source storage because the target storage has a previous version of the data before the point-in-time of the point-in-time copy relationship.

Figure 9A:
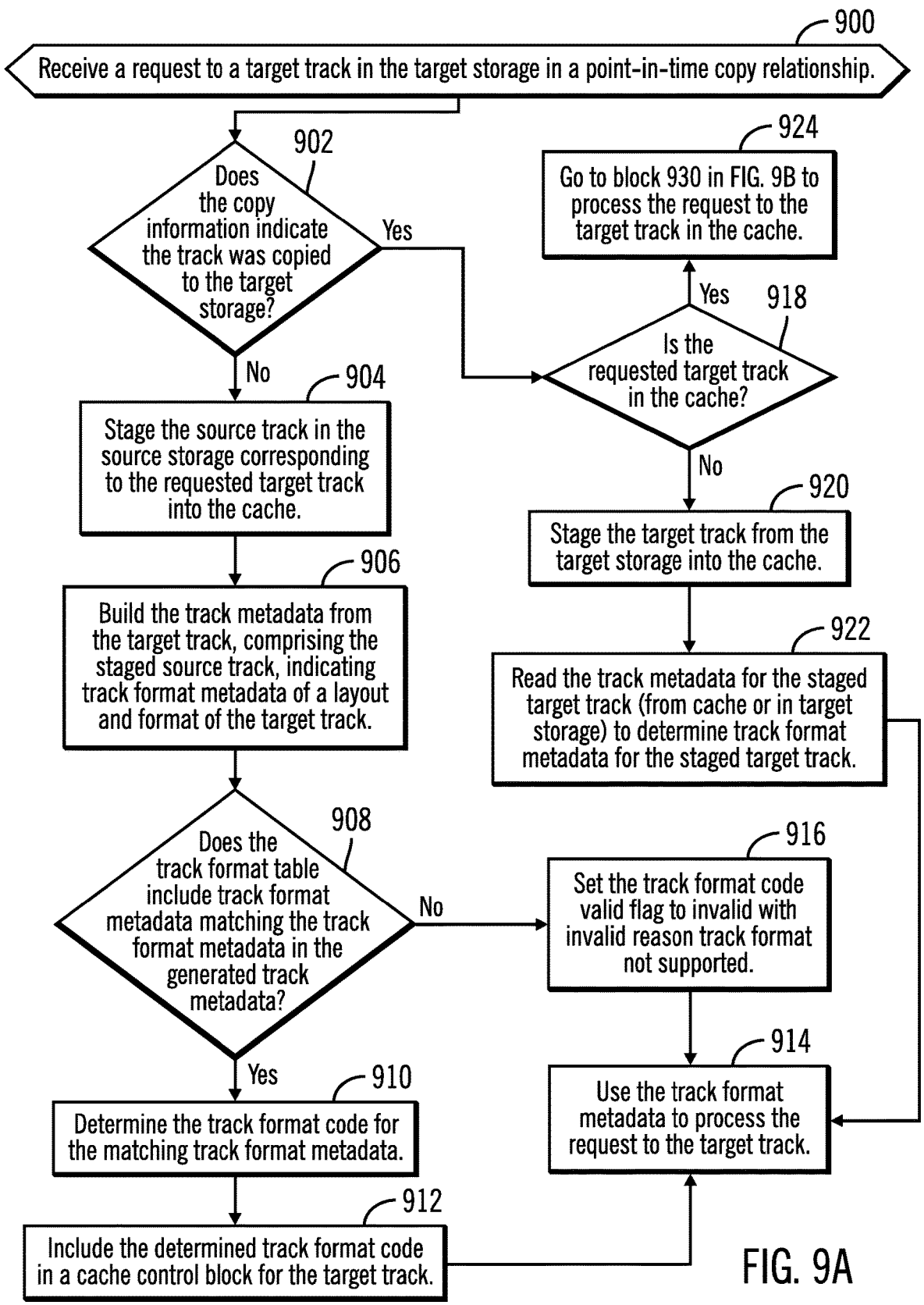
FIGS. 9a and 9b illustrate an embodiment of operations to process a request to a target track in a target storage in a copy relationship.
Figure 9B:
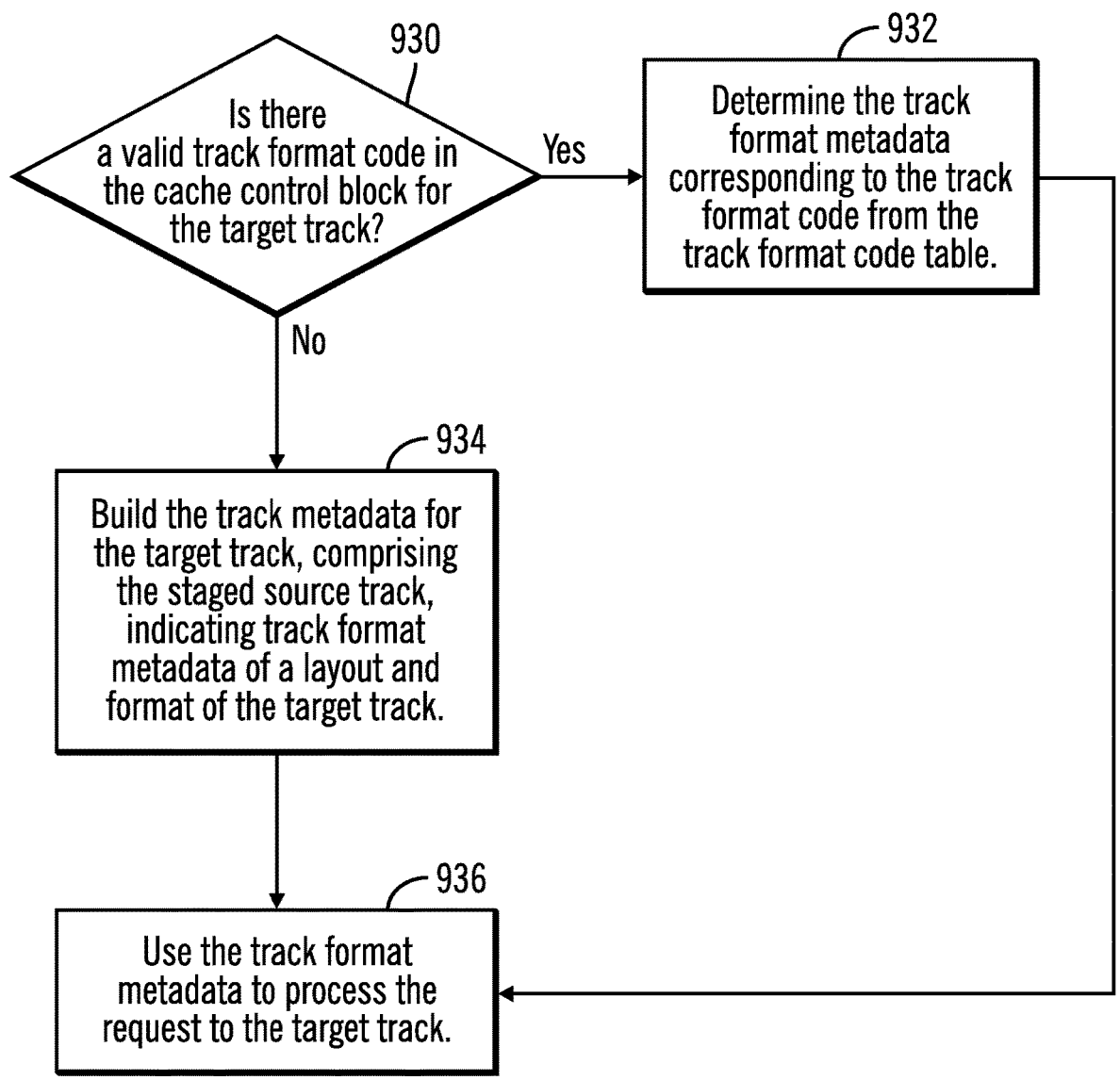

FIGS. 9a and 9b illustrate an embodiment of operations performed by the cache manager 142, storage manager 144, and copy manager 150 to manage a request from a host 100 to a target track in a target storage 508 in a copy relationship $500_i$ with a source storage 506 to store data as of a point-in-time 504. With respect to FIG. 9a, upon receiving (at block 900) a request to a target track in the target storage 508 in a point-in-time copy relationship $500_i$, the cache manager 142, or copy manager 150, determines (at block 902) whether the copy information 510 indicates the source track for the point-in-time of the copy relationship $500_i$ has not been copied yet to the target storage 508. If not, then the source track in the source storage 506 corresponding to the requested target track is staged (at block 904) to the cache 140. The cache manager 142 builds (at block 906) track metadata from the target track, comprising the staged source track, that indicates the track format metadata of a layout and format of the target track. The track metadata for the requested target track needs to be rebuilt and cannot be accessed from the target track metadata in the target storage 508 because the track metadata for the track in the target storage may be outdated with respect to the point-in-time source track staged into the cache 140.

The cache manager 142 may then determine (at block 908) whether the track format table 200 include track format metadata 204 matching the track format metadata in the generated target track metadata. If (at block 908) the track format table 200 has a track format code 202, then the track format code 202 is determined (at block 910) and included (at block 912) in the cache control block $300_i$ for the requested target track comprising the staged source track. If (at block 908) the cache manager 142 determines that the track format table 200 does not have track format metadata 204 matching that in the generated track metadata, then the track format code valid flag 316 is set (at block 916) to invalid with an invalid reason 318 indicating the track format code could not be located. From blocks 912 or 916, the track format metadata is used (at block 914) to process the request to the target track.

If (at block 902) the copy information 510 indicates the source track for the point-in-time of the copy relationship $500_i$ has been copied to the target storage 508 and if (at block 918) the target track is not in the cache 140, then the cache manager 142 stages (at block 920) the target track form the target storage 508 into the cache 140. The track metadata for the staged target track (from cache 140 or in storage 104) is read (at block 922) to determine track format metadata for the staged target track. After determining the track format metadata, control proceeds to block 914 to use the track format metadata to process the request for the target track in the cache.

If (at block 918) the requested target track is in the cache 140, then control proceeds (at block 924) to block 930 in FIG. 9b. If (at block 930) there is a valid track format code 314 in the cache control block $300_i$ for the target track in the cache 140, then the cache manager 142 determines (at block 932) the track format metadata 204 corresponding to the track format code 314 from the track format table 200. If (at block 930) there is no valid track format code 314 for the target track in the cache 140, then the cache manager 142 may not know whether a metadata track in the cache 140 or target storage having metadata for the requested target track is relevant to the target track in the cache 140, which may have been staged from the source storage 506 or the target storage 508. In such case, the cache manager 142 builds (at block 934) the track metadata for the target track, comprising the staged source track, indicating track format metadata of a layout and format of the target track in the cache 140. From blocks 932 and 934, the cache manager 142 uses (at block 936) the built or determined track format metadata to process the request to the target track in the cache 140.

With the operations of FIGS. 9a and 9b, the track format code is included in the cache control block for a point-in-time source track staged into the cache for a target track for a copy relationship. As a result, during subsequent accesses to the target track in the cache, the track format metadata for the staged source track does not have to be rebuilt and can be determined from the previously saved track format code in the cache control block. This use of the track format code substantially reduces latency of processing requests to target tracks in cache staged from the source storage because without the track format code in the cache control block, the track format metadata would have to be rebuilt from the target track in the cache because track metadata from the target storage cannot be used because the track metadata from the target storage is for a different version of the target track than was staged into the cache from the source storage.

For target tracks staged into cache from the target storage after the point-in-time copy source track was copied to the target storage, the track format code would be included in the cache control block for the target track staged from the target storage when the track metadata for the track in the cache 140 is closed according to the operations of FIG. 8.

Figure 10:
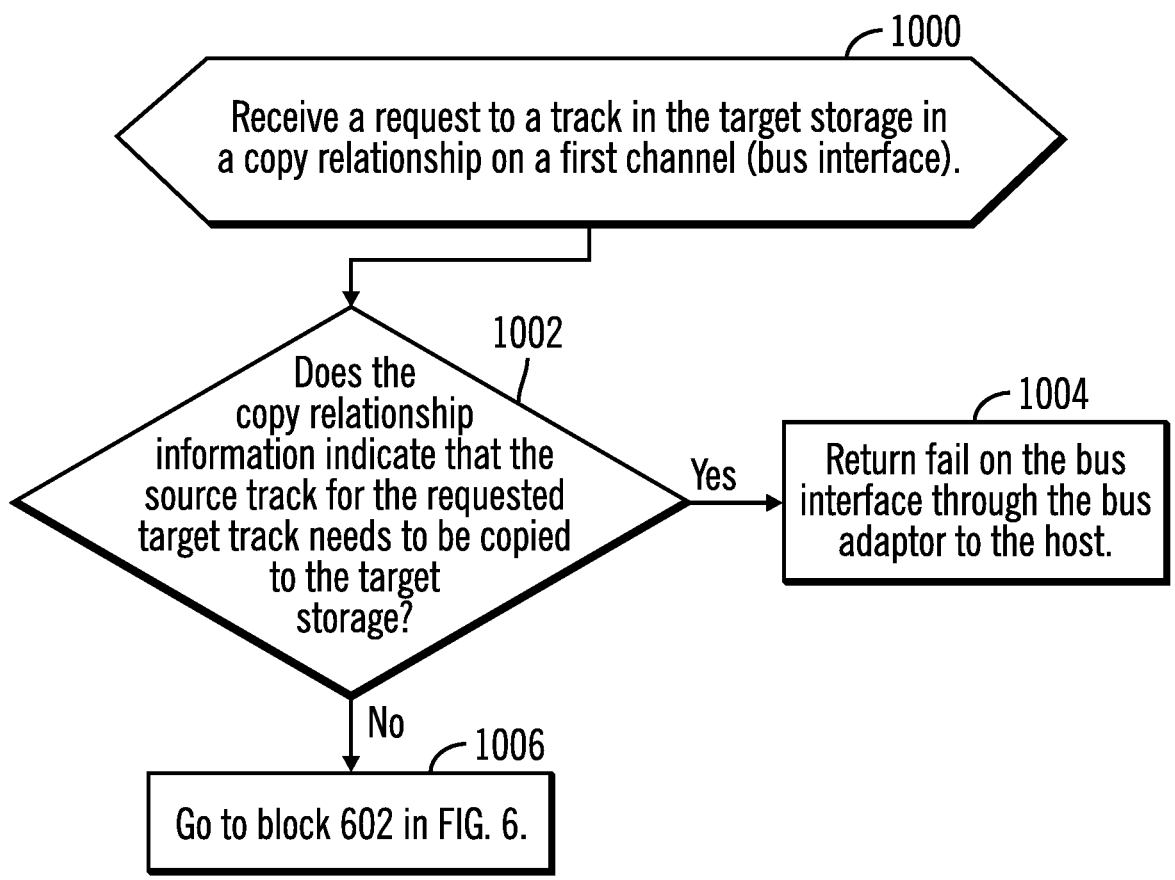
FIG. 10 illustrates an embodiment of operations to process a request to a target track in a target storage in a copy relationship on a first channel for fast processing.

FIG. 10 illustrates an embodiment of operations to process a request to a target track in the target storage 508 that is in a copy relationship $500_i$ on a first channel, such as a fast channel over a bus 118, such as a PCIe bus. As mentioned, requests on the fast or bus channel are failed unless they can be processed with very low latency. Upon receiving (at block 1000) a request to a track in the target storage 508 of a copy relationship $500_i$, the copy manager 150 determines (at block 1002) whether the copy information 510 for the copy relationship $500_i$ indicates that a source track corresponding to the requested target track needs to be copied to the target storage. If (at block 1002) the source track needs to be copied, then fail is returned (at block 1004) on the fast first channel, or bus 118 interface, through the bus host adaptors 128, 116 to the host 100. The return of failure to the host 100 causes the host to retry the request to the target track on the slower channel, such as through the network 122 and network host adaptors 120, 134. If (at block 1002) the copy relationship $500_i$ does not indicate that the source track needs to be copied to the target track, then control proceeds to block 602 in FIG. 6 to perform first or fast channel processing for the request.

With the embodiment of FIG. 10, the request on the PCIe bus channel, where the thread for the I/O task remains spinning on the request waiting for data from the host 100, is failed if the request is to a target track that needs to be updated with a corresponding source track having modified data from a copy relationship. This failure occurs because the time required to stage the corresponding source track from the source storage 506 would exceed the latency or delay requirement of the fast channel I/O request. However, if there is no source track that needs to be copied to the requested target track, then the copy relationship will not increase latency and control can proceed to FIG. 6 to attempt to satisfy the request on the first or bus channel.

Figure 11:
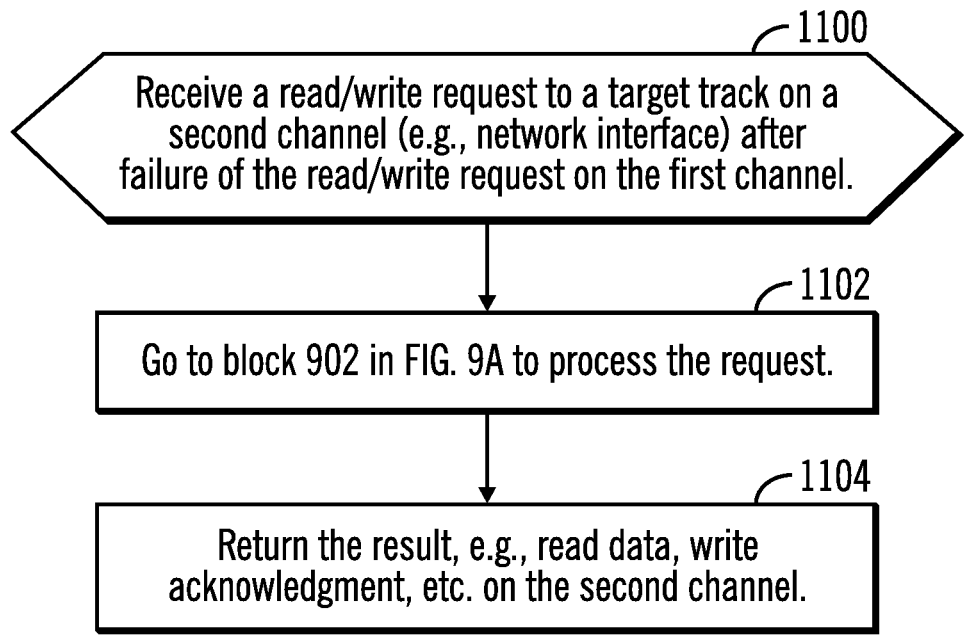
FIG. 11 illustrates an embodiment of operations to process a request to a target track in a target storage in a copy relationship on a second channel.

FIG. 11 illustrates an embodiment of operations to process a request to a target track in a copy relationship received on a second slower channel, such as a network interface, after the request is failed on the first channel. Upon receiving (at block 1100) a request, e.g., read/write request, to a target track on the second, slower, channel, through the network 122 and network host adaptors 120, 134, control proceeds (at block 1102) to block 902 in FIG. 9a to process the request. The result of processing the request according to FIG. 9a, 9b is returned to the host on the second channel, such as through the network 122.

With the operations of FIG. 11, when the request is received on the slower network channel after failure is returned on the faster bus channel, then processing may involve staging the source track for the requested target track to the cache.

When demoting a target track from the cache 140, the target track would only be destaged to the target storage if the target track includes modified data. The target track would not be destaged if unmodified, because if the target track in the cache comprises the data staged from the source track in the source storage, then the target track metadata may be different from the track metadata for the target track in the target storage, which includes the data for the target track before the source track was staged to the cache.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
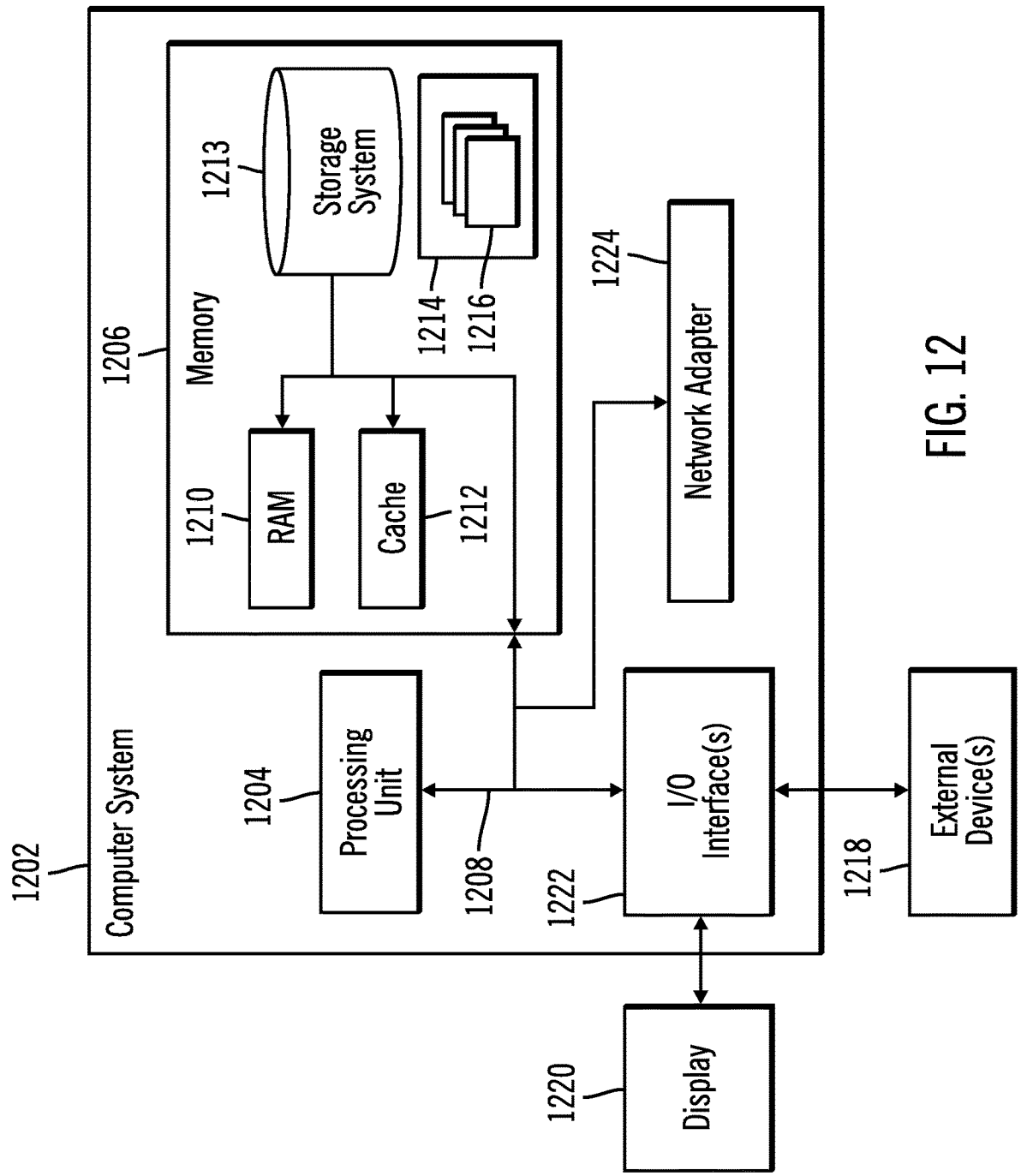
FIG. 12 illustrates an embodiment of a computer architecture used with described embodiments.

The computational components of FIG. 1, including the host 100 and storage system 102 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing read and write requests to a target storage and configured to communicate with a source storage, the computer program product comprising a computer readable storage medium having computer readable program code embodied therein that is executable to communicate with a cache and to perform operations, the operations comprising:
   receiving a request to a target track in the target storage in a point-in-time copy relationship with a source track in the source storage;
   staging the source track from the source storage to the cache to be used as the requested target track;
   including a track format code, identifying track format metadata for the staged source track, in a cache control block for the staged source track; and
   using the track format code in the cache control block to determine the track format metadata to process subsequent requests to the requested target track in the cache.

2. The computer program product of claim 1, wherein the operations further comprise:
   maintaining a track format table associating track format codes with track format metadata, wherein each of the track format metadata indicates a layout of data in a track, wherein the track format table has track format metadata for the track format code included in the cache control block that matches track format metadata for the staged source track.

3. The computer program product of claim 2, wherein the operations further comprise:
   building track format metadata from the requested target track in the cache; and
   determining whether the track format table includes track format metadata matching the built track format metadata, wherein the track format code is included in the cache control block in response to determining that the track format table includes the built track format metadata.

4. The computer program product of claim 1, wherein the source track is staged from the source storage and included in the cache control block in response to the point-in-time copy relationship indicating the source track was not copied to the target storage, wherein the operations further comprise:
   staging the requested target track from the target storage to the cache in response to the requested target track not in the cache and point-in-time copy relationship information indicating that the source track for the requested target track was copied to the target storage.

5. The computer program product of claim 1, wherein the source track is staged from the source storage and included in the cache control block in response to the point-in-time copy relationship indicating the source track was not copied to the target storage, and wherein the operations further comprise:
   determining whether there is a valid track format code in the cache control block for the requested target track in response to the requested target track not in the cache and point-in-time copy relationship information indicating that the source track for the requested target track was copied to the target storage;
   determining track format metadata corresponding to the track format code from a track format code table in response to determining that the cache control block for the requested target track includes a valid track format code; and
   using the track format metadata corresponding to the track format code to process the request to the requested target track in the cache.

6. The computer program product of claim 1, wherein the request is received on a first channel connecting to a host, wherein the operations further comprise:
   failing the request in response to point-in-time copy relationship information indicating that the source track for the requested target track needs to be copied to the target storage.

7. The computer program product of claim 6, wherein the operations further comprise:
   receiving the request to the requested target track on a second channel connected to the host after failing the request for the requested target track, wherein the staging the source track from the source storage and the including the track format code in the cache control block are performed in response to receiving the request on the second channel.

8. A system for managing read and write requests to a target storage and in communication with a source storage, comprising:
   a processor;
   a cache; and
   a computer readable storage medium having computer readable program code embodied therein that is executed by the processor to perform operations, the operations comprising:
      receiving a request to a target track in the target storage in a point-in-time copy relationship with a source track in the source storage;
      staging the source track from the source storage to the cache to be used as the requested target track;
      including a track format code, identifying track format metadata for the staged source track, in a cache control block for the staged source track; and
      using the track format code in the cache control block to determine the track format metadata to process subsequent requests to the requested target track in the cache.

9. The system of claim 8, wherein the operations further comprise:
   maintaining a track format table associating track format codes with track format metadata, wherein each of the track format metadata indicates a layout of data in a track, wherein the track format table has track format metadata for the track format code included in the cache control block that matches track format metadata for the staged source track.

10. The system of claim 9, wherein the operations further comprise:
building track format metadata from the requested target track in the cache; and
determining whether the track format table includes track format metadata matching the built track format metadata, wherein the track format code is included in the cache control block in response to determining that the track format table includes the built track format metadata.

11. The system of claim 8, wherein the source track is staged from the source storage and included in the cache control block in response to the point-in-time copy relationship indicating the source track was not copied to the target storage, wherein the operations further comprise:
staging the requested target track from the target storage to the cache in response to the requested target track not in the cache and point-in-time copy relationship information indicating that the source track for the requested target track was copied to the target storage.

12. The system of claim 8, wherein the source track is staged from the source storage and included in the cache control block in response to the point-in-time copy relationship indicating the source track was not copied to the target storage, and wherein the operations further comprise:
determining whether there is a valid track format code in the cache control block for the requested target track in response to the requested target track not in the cache and point-in-time copy relationship information indicating that the source track for the requested target track was copied to the target storage;
determining track format metadata corresponding to the track format code from a track format code table in response to determining that the cache control block for the requested target track includes a valid track format code; and
using the track format metadata corresponding to the track format code to process the request to the requested target track in the cache.

13. The system of claim 8, wherein the request is received on a first channel connecting to a host, wherein the operations further comprise:
failing the request in response to point-in-time copy relationship information indicating that the source track for the requested target track needs to be copied to the target storage.

14. The system of claim 13, wherein the operations further comprise:
receiving the request to the requested target track on a second channel connected to the host after failing the request for the requested target track, wherein the staging the source track from the source storage and the including the track format code in the cache control block are performed in response to receiving the request on the second channel.

15. A method for managing read and write requests to a target storage, comprising:
receiving a request to a target track in the target storage in a point-in-time copy relationship with a source track in a source storage;
staging the source track from the source storage to a cache to be used as the requested target track;

including a track format code, identifying track format metadata for the staged source track, in a cache control block for the staged source track; and
using the track format code in the cache control block to determine the track format metadata to process subsequent requests to the requested target track in the cache.

16. The method of claim 15, further comprising:
maintaining a track format table associating track format codes with track format metadata, wherein each of the track format metadata indicates a layout of data in a track, wherein the track format table has track format metadata for the track format code included in the cache control block that matches track format metadata for the staged source track.

17. The method of claim 16, further comprising:
building track format metadata from the requested target track in the cache; and
determining whether the track format table includes track format metadata matching the built track format metadata, wherein the track format code is included in the cache control block in response to determining that the track format table includes the built track format metadata.

18. The method of claim 15, wherein the source track is staged from the source storage and included in the cache control block in response to the point-in-time copy relationship indicating the source track was not copied to the target storage, further comprising:
staging the requested target track from the target storage to the cache in response to the requested target track not in the cache and point-in-time copy relationship information indicating that the source track for the requested target track was copied to the target storage.

19. The method of claim 15, wherein the source track is staged from the source storage and included in the cache control block in response to the point-in-time copy relationship indicating the source track was not copied to the target storage, further comprising:
determining whether there is a valid track format code in the cache control block for the requested target track in response to the requested target track not in the cache and point-in-time copy relationship information indicating that the source track for the requested target track was copied to the target storage;
determining track format metadata corresponding to the track format code from a track format code table in response to determining that the cache control block for the requested target track includes a valid track format code; and
using the track format metadata corresponding to the track format code to process the request to the requested target track in the cache.

20. The method of claim 15, wherein the request is received on a first channel connecting to a host, further comprising:
failing the request in response to point-in-time copy relationship information indicating that the source track for the requested target track needs to be copied to the target storage.

21. The method of claim 20, further comprising:
receiving the request to the requested target track on a second channel connected to the host after failing the request for the requested target track, wherein the staging the source track from the source storage and the including the track format code in the cache control block are performed in response to receiving the request on the second channel.

* * * * *